United States Patent [19]

Kojime et al.

[11] Patent Number: 5,166,186
[45] Date of Patent: Nov. 24, 1992

[54] POLYURETHANE (METH) ACRYLATE RESIN/N-VINYL PYRROLIDONE/ACRYLOYLMORPHOLINE RESIN COMPOSITION

[75] Inventors: Hisano Kojime, Kariya; Yoshinori Asano, Urawa; Yoshiharu Ohi, Hoya; Shigeo Date, Yono, all of Japan

[73] Assignees: Nippondenso Co., Ltd., Kariya; Nippon Kayaku Kabushiki Kaisha; Jujo Chemical Co., Ltd., both of Tokyo, all of Japan

[21] Appl. No.: 385,877

[22] Filed: Jul. 28, 1989

[30] Foreign Application Priority Data

Jul. 29, 1988 [JP] Japan .................. 63-188152
Jul. 27, 1989 [JP] Japan .................. 1-194548

[51] Int. Cl.⁵ .................. C08F 2/50; C08G 71/04
[52] U.S. Cl. .................. 522/37; 522/40; 522/42; 522/43; 522/44; 522/46; 522/53; 522/93; 522/96; 522/97; 526/312; 526/328
[58] Field of Search .................. 522/96, 97, 93, 37, 522/40, 42, 43, 44, 46, 53; 526/312, 328

[56] References Cited

U.S. PATENT DOCUMENTS

| | | | |
|---|---|---|---|
| 3,845,056 | 10/1974 | Robson et al. | 522/167 |
| 4,216,267 | 8/1980 | Lorenz et al. | 522/96 |
| 4,514,037 | 4/1985 | Bishop et al. | 525/454 |
| 4,682,851 | 7/1987 | Ansel | 525/920 |
| 4,886,840 | 12/1989 | Mukohyama et al. | 522/96 |

FOREIGN PATENT DOCUMENTS

| | | |
|---|---|---|
| 52-96690 | 8/1977 | Japan . |
| 61-185522 | 8/1986 | Japan . |
| 61-203123 | 9/1986 | Japan . |
| 62-199608 | 9/1987 | Japan . |
| 63-117023 | 5/1988 | Japan . |

OTHER PUBLICATIONS

Patent Abstracts of Japan, unexamined applications, C field, vol. 12, No. 365, Sep. 29, 1988, p. 45, C 532, Kokai No. 63-117023.

Primary Examiner—Marion E. McCamish
Assistant Examiner—Susan Berman
Attorney, Agent, or Firm—Cushman, Darby & Cushman

[57] ABSTRACT

A resin composition, particularly for an ink printing composition, comprising a polyurethane (meth-) acrylate resin, N-vinylpyrrolidone, and acryloylmorphline, with a photoinitiator when used as an ultraviolet ray-curable ink printing composition, and without a photoinitiator when used as an electron beam-curable ink printing composition.

14 Claims, 1 Drawing Sheet

POLYURETHANE (METH) ACRYLATE RESIN/N-VINYL PYRROLIDONE/ACRYLOYLMORPHOLINE RESIN COMPOSITION

BACKGROUND OF THE INVENTION

1. Field of the Invention

The present invention relates to a resin composition and a composition for a printing ink.

2. Description of the Related Art

As a conventional resin composition comprising a polyurethane (meth)acrylate (polyurethane acrylate and polyurethane methacrylate are meant throughout the instant specification), there can be mentioned a composition disclosed in Japanese Unexamined Patent Publication No. 63-117023.

This composition comprises a polyurethane (meth)acrylate and a polymerizable monomer comprising acryloylmorpholine. It is taught that this composition is excellent in adhesion to a substrate.

However, in this known resin composition, a further improvement of adhesion to a substrate is desired. It also is desired that interlaminar adhesion among a plurality of coating layers of the resin composition (obtained, for example, by lap-coating of a printing ink) will be improved. Moreover, when a substrate coated with this resin composition is subjected to processing such as draw-forming or piercing, breaking or cracking is often caused in the coating. It is desirable to eliminate this defect.

It is a primary object of the present invention to provide a resin composition and a printing ink composition in which the foregoing problems are solved.

SUMMARY OF THE INVENTION

We made research with a view to attaining the above-mentioned object, and as a result, it was found that the above-mentioned object can be attained by a resin composition comprising, as indispensable components, a polyurethane (meth)acrylate resin, N-vinylpyrrolidone, and acryloylmorpholine.

This composition can be used as an ultraviolet ray-curable printing ink composition. In this case, a photopolymerization initiator capable of initiating or promoting a photopolymerization reaction, a coloring or delustering pigment, and an additive for adjusting the ink adaptability and printability are incorporated into the resin composition. When the resin composition is used as an electron beam-curable printing ink composition, needless to say, a photoinitiator need not be used. Furthermore, the resin composition can be used as a heat-curable composition. In this case, an organic peroxide such as ketone peroxide, is used as the initiator.

DESCRIPTION OF PREFERRED EMBODIMENTS

The polyurethane (meth)acrylate resin used in the present invention can be, for example, a reaction product of a poly-ε-caprolactone type polyol, an organic polyisocyanate, and a hydroxy(meth)acrylate. The poly-ε-caprolactone type polyol is obtained by reaction of ε-caprolactone with a compound having at least two hydroxyl groups. By this reaction, a polyol having terminal hydroxyl groups, in which poly-ε-caprolactone is addition-polymerized to the hydroxyl groups of the compound having at least two hydroxyl groups, is obtained. The kind of the compound having at least two hydroxyl groups is not particularly critical, but, for example, there can be used ethylene glycol, propylene glycol, diethylene glycol, pentaerythritol, trimethylolpropane and neopentyl glycol. A compound having two hydroxyl groups is preferably used. It is preferred that the number average molecular weight of the poly-ε-caprolactone type polyol is about 510 to about 2,100. If the molecular weight is below this range, the processability of the polyurethane (meth)acrylate resin tends to grow degraded, and if the molecular weight exceeds the above range, the curability of the polyurethane (meth)acrylate is often degraded. The poly-ε-caprolactone type polyol is easily commercially available. For example, there can be mentioned general products of the Placcel series supplied by Daicel Kagaku K.K. such as Placcel 205 (number average molecular weight of 550), Placcel L205AL (number average molecular weight of 550), Placcel 208 (number average molecular weight of 850), Placcel L208AL (number average molecular weight of 850), Placcel 212 (number average molecular weight of 1,250), Placcel 212AM (number average molecular weight of 1,250), Placcel 212AL (number average molecular weight of 1,250), Placcel 220 (number average molecular weight of 2,000), Placcel 220AM (number average molecular weight of 2,000), Placcel 220AL (number average molecular weight of 2,000), Placcel 220N (number average molecular weight of 2,000) and Placcel 220N-1 (number average molecular weight of 2,000). Each grade of the poly-ε-caprolactone type polyol can be used singly, or can be used in the form of a mixture with other optional grades after adjustment of the molecular weight.

Organic polyisocyanate is a compound having at least two isocyanate groups, and a compound having two isocyanate groups is preferred. For example, there can be used diisocyanates such as tolylene diisocyanate, 4,4'-diphenylmethane diisocyanate, isophorone diisocyanate, 4,4'-dicyclohexylmethane diisocyanate, hexamethylene diisocyanate, and 2,2'-trimethylhexamethylene diisocyanate.

Hydroxy(meth)acrylate compound is a (meth)acrylate compound having one hydroxyl group and one (meth)acryloyl group in the molecule. The (meth)acrylate means a methacrylate and an acrylate in the instant specification. From the viewpoint of the curing speed, a hydroxyacrylate having an acryloyl group is preferred as the hydroxy(meth)acrylate. For example, there can be mentioned β-hydroxyethyl (meth)acrylate, β-hydroxypropyl (meth)acrylate, β-hydroxylauryl (meth)acrylate, and an ε-caprolactone/β-hydroxyethyl (meth)acrylate adduct.

For the preparation of the polyurethane (meth)acrylate resin, at first, a poly-ε-caprolactone type polyol is reacted with an organic polyisocyanate at an NCO group/OH group ratio of from 1 to 2. Preferably, the reaction is carried out at a temperature of 50 to 100° C. with stirring, and a polyurethane prepolymer having terminal isocyanate groups is thus obtained. If the NCO group/OH group ratio is lower than 1, the unreacted polyol compound is left. If this ratio is higher than 2, the unreacted isocyanate compound is left. Then, the obtained isocyanate-functional prepolymer is reacted with a hydroxy(meth)acrylate compound in an amount of 1 to 1.1 moles per mole of the residual NCO group of the prepolymer. This reaction is carried out in the presence of a tertiary amine such as triethylamine, an organic metal compound such as dibutyl tin dilaurate or dibutyl tin acetate, or a customary catalyst such as tin chloride, preferably at a temperature of 50 to 100° C. with stirring. By this reaction, a polyurethene (meth)acrylate resin having terminal (meth)acryloyl groups is formed. If the molar ratio of the hydroxy(meth)acrylate compound to the residual NCO group of the prepolymer is lower than 1, the NCO group is left, and if this molar ratio is higher than 1.1, a large amount of the hydroxy(meth)acrylate compound is left. It is preferred that this molar ratio be in the range of from 1.0 to 1.05.

For the production of the polyurethane (meth)acrylate resin used in the present invention, in addition to the starting poly-ε-caprolactone type polyol, there can be used other known polyol compounds, for example, polyols such as polytetramethylene ether glycol, ethylene glycol, propylene glycol, 1,3-butylene glycol, neopentyl glycol, cyclohexanedimethanol, tricyclodecabedimethylol, 1,4-butanediol, 1,6-hexanediol and trimethylolpropane, and polypropylene glycol and polyethylene glycol.

It is preferred that the number average molecular weight of the polyurethane (meth)acrylate resin be about 1,500 to about 10,000. If the molecular weight is lower than about 1,500, when the composition of the present invention is formed into an ink, the processability tends to lower, and if the molecular weight is higher than about 10,000, the curability is often degraded.

The polymerizable monomer to be combined with the polyurethane (meth)acrylate resin in the present invention includes N-vinylpyrrolidone and acryloylmorpholine as the monofunctional (having one polymerizable double bond in the molecule), ethylenically unsaturated monomer. Note that the formal name of the N-vinylpyrrolidone is N-vinyl-2-pryrrolidone. The structural formula of N-vinylpyrrolidone is and that of acryloylmorpholine is N-vinylpyrrolidone and acryloylmorpholine are easily commercially available. An example of the commercial product of N-vinylpyrrolidone V-Pyrol (registered trademark) supplied by GAF Corp., and an example of acryloylmorpholine is ACMO supplied by Kohjin K.K.

Figure 1:
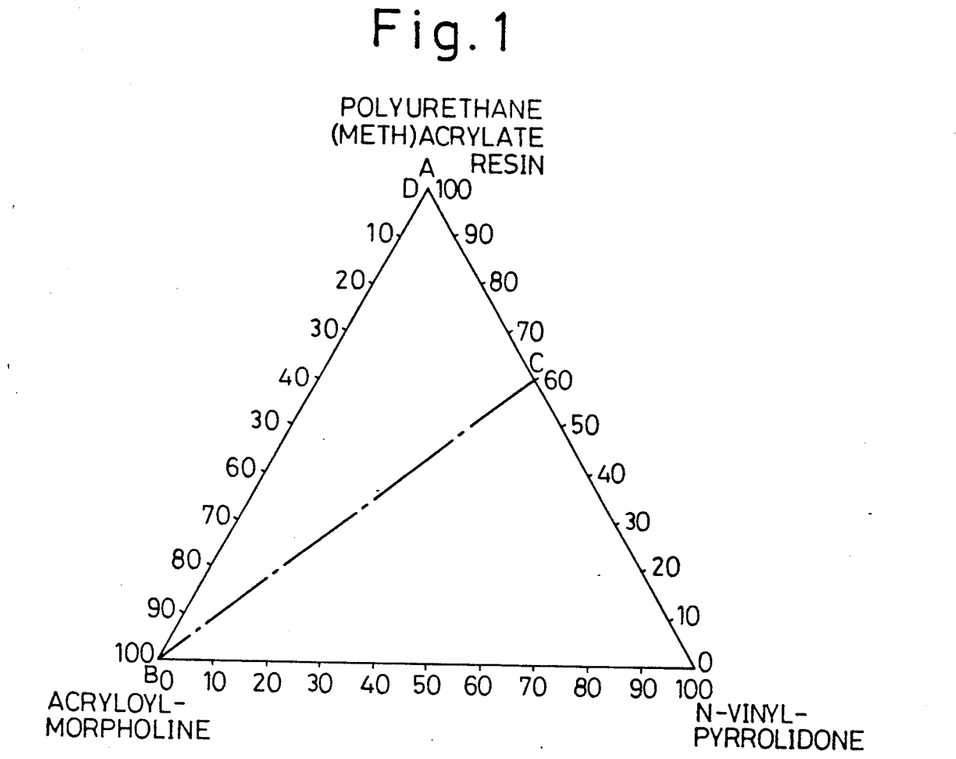
FIG. 1 is a triangular composition coordinate illustrating the range of the mixing ratio of the components in the present invention and FIG. 2 is a sectional view showing a test piece used for evaluation of the composition of the present invention.

The vehicle in the resin composition of the present invention is composed mainly of a polymerizable resin mixture comprising the polyurethane (meth)acrylate resin, N-vinylpyrrolidone, and acryloylmorpholine, and the mixing weight ratio of the polyurethane (meth)acrylate resin, N-vinylpyrrolidone, and acryloylmorpholine is shown in the triangular composition coordinate of FIG. 1. Referring to FIG. 1, it is preferred that this mixing weight ratio be on the line connecting point A (100% of polyurethane (meth)acrylate), point B (100% of acryloylmorpholine), and point C (60% of polyurethane (meth)acrylate and 40% of N-vinylpyrrolidone) or within the range surrounded by said line, where all of said three components are present.

If the weight ratio of the three components is within the above-mentioned range, swelling or deterioration of a rubber squeegee used for uniformly coating the resin composition of the present invention on a substrate can be controlled, and formation of a streak pattern on the coating film surface by deterioration of the squeegee can be prevented at the coating step. Since the swelling and deterioration of the squeegee are mainly caused by acryloylmorpholine and N-vinylpyrrolidone, even if the kind, that is, the molecular weight, of the polyurethane (meth)acrylate resin is changed, the preferred resin shown in the triangular composition coordinate is not changed. This composition range is quantitatively determined according to the squeegee-deteriorating actions of acryloylmorpholine and N-vinylpyrrolidone. Incidentally, N-vinylpyrrolidone has a squeegee-swelling and deteriorating action about 2.5 times as high as the action of acryloylmorpholine.

In the present invention, a monofunctional, ethylenically unsaturated monomer or a bifunctional, ethylenically unsaturated monomer can be added to the above-mentioned vehicle to finely adjust the viscosity of the resin composition or printing ink composition.

As the monofunctional, ethylenically unsaturated monomer, there can be mentioned 2-ethylhexyl acrylate, ethylcarbitol acrylate, lauryl acrylate, diethylene glycol (2-ethylhexyl) ether acrylate, phenoxyethyl acrylate, nonylphenoxyethyl acrylate, 2-hydroxy-3-phenoxypropyl acrylate, dicyclopentenyl acrylate, dicyclopentenyloxyethyl acrylate, isobornyl acrylate, and N-n-butyl-O-acryloyloxyethylcarbonate, etc. Use of ethylcarbitol acrylate, diethylene glycol (2-ethylhexyl) ether acrylate, and N-n-butyl-O-acryloyloxyethylcarbonate is preferred.

As the bifunctional, ethylenically unsaturated monomer, there can be mentioned alkylene glycol diacrylates such as 1,6-hexanediol diacrylate, ethylene glycol diacrylate, propylene glycol diacrylate and neopentylglycol diacrylate, polyoxyalkylene glycol diacrylates such as triethylene glycol diacrylate, tripropylene glycol diacrylate, polyethylene glycol diacrylate and polypropylene glycol diacrylate, bisphenol A diacrylate and a diacrylate of an alkylene oxide adduct of bisphenol A, and epoxy diacrylates such as ethylene glycol diglycidyl ether diacrylate and propylene glycol diglycidyl ether acrylate. Ethylene glycol diacrylate is especially preferred.

In the present invention, as the vehicle component, other photopolymerizable monofunctional or bifunctional polymerizable compounds can be used, so far as attainment of the object of the present invention is not hindered. The monofunctional polymerizable compound includes monoacrylates such as a polyoxyalkylene glycol monoacrylate and an oligo ester monoacrylate, and the bifunctional polymerizable compound includes acrylates such as polyurethane diacrylates other than the above-mentioned polyurethane diacrylates, epoxy diacrylates, polyester diacrylates, polyether diacrylates, tertiary amine-modified ester diacrylates, and oligo ester diacrylates. The range where attainment of the object of the present invention is not hindered means that the polymerizable compound is incorporated in an amount of up to 25 parts by weight per 100 parts by weight of the polymerizable resin mixture of the polyurethane (meth)acrylate resin and the polymerizable monomer.

The photopolymerization initiator used in the present invention is a compound capable of initiating or promoting the photomerization reaction of the polymerizable resin mixture and the polymerizable compound as the vehicle component and can be selected from known compounds. For example, there can be mentioned acetophenones, benzophenones, carbonyl compounds such as Michler's ketone, benzil, benzoine alkyl ethers, benzyl dimethyl ketal and benzoyl benzoate, and sulfur compounds such as tetramethyl thiuram monosulfide. At least one compound selected from these compounds can be used. Furthermore, a sensitizer capable of promoting the photopolymerization reaction more highly when used in combination with the photopolymerization initiator, than in case of single use of the photopolymerization initiator, can be used in combination with the photopolymerization initiator. For example, there can be used amine compounds such as triethanolamine, isoamyl p-dimethylaminobenzoate and N,N-diethyl-p-aminobenzonitrile, phosphorus compounds such as tri-n-butylphosphine, and chlorine compounds such as hexachloroethane. It is preferred that the photopolymerization initiator and sensitizer be incorporated in an amount of 1 to 25 parts by weight per 100 parts by weight of the vehicle. If this amount is smaller than 1 part by weight per 100 parts by weight of the vehicle, the polymerization reaction is not sufficiently advanced even under irradiation with ultraviolet rays and no practical curability can be obtained. If this amount is larger than 25 parts by weight per 100 parts by weight of the vehicle, no particular advantage can be attained, but because of self-absorption of the initiator, the curability is degraded in the bottom portion in the thickness direction of the film and bonding is inhibited. Incidentally, in the case where the printing ink composition is cured by electron beams, the photopolymerization initiator need not be incorporated.

Commercially available inorganic coloring pigments, organic coloring pigments, inorganic extender pigments, organic extender pigments, inorganic delustering powder pigments, organic delustering powder pigments, metal powder pigments and fluorescent pigments can be used in the present invention. Coloring, delustering, extender and metallic pigments can be used singly or in combination according to the intended use of the ink. The amount incorporated of the pigment is determined according to the characteristics of the pigment and the intended object, so far as the curability of the printing ink composition by irradiation with ultraviolet rays is not degraded. It is preferred that at least one pigment selected from the foregoing pigments be used in an amount of 1 to 150 parts by weight per 100 parts by weight of the vehicle. If the amount of the pigment is smaller than 1 part by weight per 100 parts by weight of the vehicle, the composition cannot be used as an ink, and if the amount of the pigment exceeds 150 parts by weight per 100 parts by weight of the vehicle, the curability is degraded and the composition cannot retain a state of a paste having a printable flowability.

The additive optionally used in the present invention exerts the function of adjusting the ink adaptability or printability of the composition, and the kind of the additive is not particularly critical. For example, commercially available defoaming agents, levelling agents, pigment-wetting and dispersing agents, slipping agents, flow modifiers, and thermal polymerization inhibitors can be used.

The printing ink composition of the present invention is applied to a substrate by the screen printing method, one of the stencil printing methods, and the ink layer is irradiated with ultraviolet rays by a commercially available ultraviolet ray irradiator to cause the photopolymerization reaction and effect the crosslinking and curing. In case of lap printing or multi-color printing, the above operation is repeated. As the light source lamp used for the ultraviolet ray irradiator, there can be mentioned a metal halide lamp, a high-pressure mercury lamp, and a xenon lamp. Ultraviolet rays having a wavelength of about 200 to about 420 nm are emitted from these light source lamps.

Of course, the crosslinking and curing can be effected by using an electron beam irradiator as the irradiation apparatus. In this case, the photopolymerization initiator need not be incorporated in the printing ink composition of the present invention, as pointed out hereinbefore.

As the substrate to which the resin composition of the present invention is applied, there can be mentioned resins, papers, and metals. The resin composition of the present invention can be used for the production of dial plates of meters of cars, display plates of panels of electric appliances, decorative plates of ordinary cases, and the like.

Peeling of the coating film of the resin composition of the present invention from the substrate can be prevented, and in case of a multi-layer coating, interlaminar peeling can be prevented. Furthermore, even if the coated substrate is formed into an optional form by processing such as draw-forming or piercing, breaking or cracking of the coating can be prevented.

The present invention will now be described in detail with reference to the following examples, that by no means limit the scope of the invention. Incidentally, all "parts" in the examples are by weight.

EXAMPLES OF SYNTHESIS OF POLYURETHANE (Meth)acrylate

Synthesis Example 1

A 2-liter reaction vessel equipped with a stirrer, a temperature-adjusting device, a thermometer, and a condenser was charged with 262.6 parts of a poly-ε-caprolactone type polyol (Placcel 205 supplied by Daicel Kagaku K.K.; OH value=213.7 mgKOH/g, number average molecular weight=525.1), 407.2 parts of another poly-ε-gaprolactone type polyol (Placcel 208 supplied by Daicel Kagaku K.K.; OH value=137.8 mgKOH/g, number average molecular weight=814.4), and 329 parts of isophorone diisocyanate. The temperature was elevated to 80° C., and reaction was carried out for 13 hours. Then, the reaction liquid was cooled to 60° C. and 41.9 parts of β-hydroxyl acrylate, 0.49 part of metoquinone, and 0.20 part of di-n-butyl tin dilaurate were added to the reaction liquid. The temperature was elevated and the reaction was carried out at 80° C. The number average molecular weight of the product (oligomer A) was about 7,500. Incidentally, the number average molecular weight was measured by GPC and expressed by the value calculated based on standard polystyrene.

Synthesis Example 2

A 2-liter reaction vessel equipped with a stirrer, a temperature-adjusting device, a thermometer, and a condenser was charged with 262.6 parts of a poly-ε-caprolactone type polyol (Placcel 205 supplied by Daicel Kagaku K.K.; OH value=213.7 mgKOH/g, number average molecular weight=525.1), 407.2 parts of another poly-ε-caprolactone type polyol (Placcel 208 supplied by Daicel Kagaku K.K.; OH value=137.8 mgKOH/g, number average molecular weight=814.4), and 329 parts of isophorone diisocyanate. The temperature was elevated to 80° C. and the reaction was carried out for 13 hours. Then, the reaction liquid was cooled to 60° C. and 113.3 parts of β-hydroxyl acrylate, 0.56 part of metoquinone, and 0.22 part of di-n-butyl tin laurate were added to the reaction liquid. Then, the temperature was elevated and the reaction was carried out at 80° C. The number average molecular weight of the product (oligomer B) was about 2,865.

Synthesis Example 3

A 2-liter reaction vessel equipped with a stirrer, a temperature-adjusting device, a thermometer and a condenser was charged with 262.6 parts of a poly-ε-caprolactone type polyol (Placcel 205 supplied by Daicel Kagaku K.K.; OH value=213.7 mgKOH/g, number average molecular weight=525.1), 407.2 parts of another poly-ε-caprolactone type polyol (Placcel 208 supplied by Daicel Kagaku K.K.; OH value=137.8 mgKOH/g, number average molecular weight=814.4), and 316.8 parts of isophorone diisocyanate. The temperature was elevated to 80° C. and the reaction was carried out for 13 hours. Then, the reaction liquid was cooled to 60° C. and 99.2 parts of β-hydroxyl acrylate, 0.54 part of metoquinone, and 0.22 part of di-n-butyl tin laurate were added to the reaction liquid. Then, the temperature was elevated and the reaction was carried out at 80° C. The number average molecular weight of the product (oligomer C) was about 3,200.

Synthesis Example 4

A 2-liter reaction vessel equipped with a stirrer, a temperature-adjusting device, a thermometer, and a condenser was charged with 525.1 parts of a poly-ε-caprolactone type polyol (Placcel 205 supplied by Daicel Kagaku K.K.; OH value=213.7 mgKOH/g, number average molecular weight=525.1), and 333.5 parts of isophorone diisocyanate. The temperature was elevated to 80° C. and the reaction was carried out for 13 hours. Then, the reaction liquid was cooled to 60° C. and 119.5 parts of β-hydroxylethyl acrylate, 0.49 part of metoquinone, and 0.25 part of di-n-butyl tin laurate were added to the reaction liquid. Then, the temperature was elevated and the reaction was carried out at 80° C. The number average molecular weight of the product (oligomer D) was about 2,500.

Synthesis Example 5

A 2-liter reaction vessel equipped with a stirrer, a temperature-adjusting device, a thermometer, and a condenser was charged with 814.4 parts of a poly-ε-caprolactone type polyol (Placcel 208 supplied by Daicel Kagaku K.K.; OH value=137.8 mgKOH/g, number average molecular weight=814.4), and 444.6 parts of isophorone diisocyanate, and the temperature was elevated to 80° C. and reaction was carried out for 13 hours. Then, the reaction liquid was cooled to 60° C. and 84 parts of β-hydroxyl acrylate, 0.67 part of metoquinone and 0.27 part of di-n-butyl tin laurate were added to the reaction liquid. Then, the temperature was elevated and reaction was carried out at 80° C. The number average molecular weight of the product (oligomer E) was about 1,580.

Synthesis Example 6

A 2-liter reaction vessel equipped with a stirrer, a temperature-adjusting device, a thermometer, and a condenser was charged with 262.6 parts of a poly-ε-caprolactone type polyol (Placcel 205 supplied by Daicel Kagaku K.K.; OH value=213.7 mgKOH/g, number average molecular weight=525.1), 407.2 parts of another poly-ε-caprolactone type polyol (Placcel 208 supplied by Daicel Kagaku K.K.; OH value=137.8 mgKOH/g, number average molecular weight=814.4), and 244.5 parts of isophorone diisocyanate. The temperature was elevated to 80° C. and the reaction was carried out for 15 hours. Then, the reaction liquid was cooled to 60° C. and 23.9 parts of β-hydroxyl acrylate, 0.47 part of metoquinone, and 0.19 part of di-n-butyl tin laurate were added to the reaction liquid. Then, the temperature was elevated and the reaction was carried out at 80° C. The number average molecular weight of the product (oligomer F) was about 9,270.

Synthesis Example 7

A 1-liter reaction vessel equipped with a stirrer, a temperature-adjusting device, a thermometer, and a condenser was charged with 365.3 parts of a polyester (OH value=55.3 mgKOH/g) comprising 40 mole% of a poly-ε-caprolactone type polyol (Placcel 205 supplied by Daicel Kagaku K.K.; OH value=214.3 mgKOH/g, number average molecular weight=523.7) and 60 mole% of adipic acid and 80 parts by weight of isophorone diisocyanate. The temperature was elevated to 80° C. and the reaction was carried out for 2.5 hours. Then, the reaction liquid was cooled to 60° C. and 43.1 parts of β-hydroxyl acrylate, 0.24 part of metoquinone, and 0.05 part of di-n-butyl tin dilaurate were added to the reaction liquid. The temperature was elevated and the reaction was carried out at 80° C. The number average molecular weight of the product (oligomer G) was about 2,710.

Synthesis Example 8

A 1-liter reaction vessel equipped with a stirrer, a temperature-adjusting device, a thermometer, and a condenser was charged with 350.7 parts of a polyester (OH value=64.0 mgKOH/g) comprising 40 mole% of a poly-ε-caprolactone type polyol (Placcel 205 supplied by Daicel Kagaku K.K.; OH value=214.3 mgKOH/g, number average molecular weight=523.7) and 88.9 parts of isophorone diisocyanate. The temperature was elevated to 80° C. and the reaction was carried out for 2.5 hours. Then, the reaction liquid was cooled to 60° C. and 47.8 parts of β-hydroxyl acrylate, 0.24 part of metoquinone, and 0.05 part of di-n-butyl tin dilaurate were added to the reaction liquid. The temperature was elevated and the reaction was carried out at 80° C. The number average molecular weight of the product (oligomer H) was about 1,585.

Synthesis Example 9

A 2-liter reaction vessel equipped with a stirrer, a temperature-adjusting device, a thermometer, and a condenser was charged with 697 parts of polytetramethylene ether glycol (OH value=161 mgKOH/g, number average molecular weight=697) and 333.5 parts of isophorone diisocyanate. The temperature was elevated to 80° C. and the reaction was carried out for 15 hours. Then, the reaction liquid was cooled to 60° C. and 119.6 parts of β-hydroxyethyl acrylate, 0.58 part of metoquinone, and 0.23 part of di-n-butyl tin dilaurate were added to the reaction liquid. The temperature was elevated and the reaction was carried out at 80° C. The number average molecular weight of the product (oligomer I) was about 3,000.

Synthesis Example 10

A 2-liter reaction vessel equipped with a stirrer, a temperature-adjusting device, a thermometer, and a condenser was charged with 697 parts of polytetramethylene ether glycol (OH value=161 mgKOH/g, number average molecular weight=697) and 277.9 parts of isophorone diisocyanate. The temperature was elevated to 80° C. and the reaction was carried out for 15 hours. Then, the reaction liquid was cooled to 60° C. and 213.2 parts of β-hydroxyethyl acrylate, 0.59 part of metoquinone, and 0.24 part of di-n-butyl tin dilaurate were added to the reaction liquid. The temperature was elevated and the reaction was carried out at 80° C. The number average molecular weight of the product (oligomer J) was about 6,500.

Examples of Ink Compositions

White and black inks as typical examples of the ultraviolet ray-curable screen ink will now be described with reference to the following composition examples. Incidentally, when these inks are used as the electron beam-curable screen ink, the initiators shown in the compositions need not be incorporated.

Composition Examples 1 through 14

White ink compositions are shown in Tables 1-1 and 1-2.

Comparative Composition Examples 1 through 5

Comparative white ink compositions are shown in Table 2.

Composition Examples 15 through 33

Black ink compositions are shown in Tables 3-1 and 3-2.

Comparative Composition Examples 6 through 10

Comparative black ink compositions are shown in Table 4.

With respect to each of the inks shown in Tables 1 through 4, the viscosity was measured by a Brookfield viscometer (Model HAT) at an ink temperature of 25° C. and a rotor rotation number of 100 rpm.

TABLE 1-1

| Components | \multicolumn{9}{c}{Composition Example No.} |
|---|---|---|---|---|---|---|---|---|---|
|  | 1 | 2 | 3 | 4 | 5 | 6 | 7 | 8 | 9 |
| Synthetic oligomer |  |  |  |  |  |  |  |  |  |
| A | 38 | 38 | 38 | 38 | 38 | — | — | — | — |
| B | — | — | — | — | — | 50 | — | — | — |
| C | — | — | — | — | — | — | 50 | — | — |
| D | — | — | — | — | — | — | — | — | — |
| E | — | — | — | — | — | — | — | 58 | — |
| F | — | — | — | — | — | — | — | — | 29 |
| Monomer |  |  |  |  |  |  |  |  |  |
| Ethylcarbitol acrylate*1 | 17 | — | — | — | 12 | 10.5 | 10.5 | 10.5 | 10.5 |
| Lauryl acrylate*2 | — | 17 | — | — | — | — | — | — | — |
| Phenoxyethyl acrylate*3 | — | — | 17 | — | — | — | — | — | — |
| Diethylene glycol (2-ethyl-hexyl) ether acrylate*4 | — | — | — | 17 | — | — | — | — | — |
| Tetraethylene glycol diacrylate | — | — | — | — | 5 | — | — | — | — |
| N-vinylpyrrolidone*5 | 5 | 5 | 5 | 5 | 5 | 10.5 | 10.5 | 10.5 | 10.5 |
| 2-Ethylhexyl acrylate | — | — | — | — | — | — | — | — | — |
| Acryloylmorpholine*6 | 40 | 40 | 40 | 40 | 40 | 29 | 29 | 21 | 50 |
| Irgacure 184*7 | 4 | 4 | 4 | 4 | 4 | 4 | 4 | 4 | 4 |
| Irgacure 651*8 | 4 | 4 | 4 | 4 | 4 | 4 | 4 | 4 | 4 |
| Pigment (TiO$_2$ or the like) | 90 | 90 | 90 | 90 | 90 | 90 | 90 | 90 | 90 |
| Additive | 2 | 2 | 2 | 2 | 2 | 2 | 2 | 2 | 2 |
| Viscosity ps (25° C.) | 90 | 90 | 144 | 114 | 132 | 84 | 88 | 85 | 83 |

Note
*1Biscoat #190 supplied by Osaka Yuki Kagaku Kogyo K.K.
*2L-A supplied by Kyoeisha Yushi Kagaku Kogyo K.K.
*3Aronix M-101 supplied by Toa Gosei Kagaku Kogyo K.K.
*4Aronix M-120 supplied by Toa Gosei Kagaku Kogyo K.K.
*5V-Pyrol (registered trademark) supplied by GAF Corp.
*6ACMO supplied by Kohjin K.K.
*71-Hydroxycyclohexylphenylketone supplied by Nippon Ciba-Geigy K.K. (need not be incorporated in case of electron beam-curable screen ink)
*82,2-Dimethoxy-2-phenylacetophenone supplied by Nippon Ciba-Geigy K.K. (need not be incorporated in case of electron beam-curable screen ink)

TABLE 1-2

| Component | \multicolumn{5}{c}{Composition Example No.} |
|---|---|---|---|---|---|
|  | 10 | 11 | 12 | 13 | 14 |
| Oligomer |  |  |  |  |  |
| Polybd R-45ACR-LC*9 | 50 | — | — | — | — |
| G | — | 50 | — | — | — |
| H | — | — | 50 | — | — |
| I | — | — | — | 50 | — |
| J | — | — | — | — | 38 |
| Monomer |  |  |  |  |  |
| N-Vinylpyrrolidone*5 | 10.5 | 10.5 | 10.5 | 10.5 | 10.5 |
| Acryloylmorpholine*6 | 29 | 29 | 29 | 29 | 41 |
| Ethylcarbitol acrylate*1 | 10.5 | 10.5 | 10.5 | 10.5 | 10.5 |
| Irgacure 184*7 | 4 | 4 | 4 | 4 | 4 |

TABLE 1-2-continued

| Component | Composition Example No. | | | | |
|---|---|---|---|---|---|
| | 10 | 11 | 12 | 13 | 14 |
| Irgacure 651*8 | 4 | 4 | 4 | 4 | 4 |
| Pigment (TiO2 or the like) | 90 | 90 | 90 | 90 | 90 |
| Additive | 2 | 2 | 2 | 2 | 2 |
| Viscosity ps (25° C.) | 133 | 91 | 94 | 105 | 147 |

Note
*1, *5, *6, *8Same as in Table 1-1
*9Product supplied by Idemitsu Sekiyu Kagaku K.K. (having butadiene skeleton in main chain)

TABLE 2

| Component | Comparative Composition Example No. | | | | |
|---|---|---|---|---|---|
| | 1 | 2 | 3 | 4 | 5 |
| Synthetic oligomer | | | | | |
| A | — | — | 50 | 50 | — |
| B | 50 | 50 | — | — | — |

TABLE 2-continued

| Component | Comparative Composition Example No. | | | | |
|---|---|---|---|---|---|
| | 1 | 2 | 3 | 4 | 5 |
| D | — | — | — | — | 56 |
| Monomer | | | | | |
| N-Vinylpyrrolidone*5 | 50 | — | 50 | — | 34 |
| Acryloylmorpholine*6 | — | 50 | — | 50 | — |
| 2-Ethylhexyl acrylate | — | — | — | — | 10 |
| Tetraethylene glycol diacrylate | — | — | — | — | — |
| Irgacure 184*1 | 4 | 4 | 4 | 4 | 4 |
| Irgacure 651*2 | 4 | 4 | 4 | 4 | 4 |
| Pigment (TiO2 or the like) | 90 | 90 | 90 | 90 | 90 |
| Additive | 2 | 2 | 2 | 2 | 2 |
| Viscosity ps (25° C.) | 60 | 140 | 159 | 461*3 | 92 |

Note
*1, *2Initiator and sensitizer (need not be incorporated in case of electron beam curing)
*3Rotor rotation number = 50 rpm
*5V-Pyrol (registered trademark) supplied by GAF Corp.
*6ACMO supplied by Kohjin K.K.

TABLE 3-1

| Components | Composition Example No. | | | | | | | | | | |
|---|---|---|---|---|---|---|---|---|---|---|---|
| | 15 | 16 | 17 | 18 | 19 | 20 | 21 | 22 | 23 | 24 | 25 |
| Synthetic oligomer | | | | | | | | | | | |
| A | 35 | 35 | 35 | 35 | 35 | — | — | — | — | — | — |
| B | — | — | — | — | — | 48 | 40 | — | — | — | — |
| C | — | — | — | — | — | — | — | 48 | 40 | — | — |
| D | — | — | — | — | — | — | — | — | — | — | — |
| E | — | — | — | — | — | — | — | — | — | 56 | — |
| F | — | — | — | — | — | — | — | — | — | — | 28 |
| Tertiary amine-modified diacrylate oligomer | 13 | 13 | 13 | 13 | 8 | — | 7 | — | 7 | — | — |
| Monomer | | | | | | | | | | | |
| Ethylcarbitol acrylate*1 | 10 | — | — | — | 10 | 16 | 18 | 16 | 18 | 16 | 16 |
| Lauryl acrylate*2 | — | 10 | — | — | — | — | — | — | — | — | — |
| Phenoxyethyl acrylate*3 | — | — | 10 | — | — | — | — | — | — | — | — |
| Diethylene glycol (2-ethylhexyl) ether acrylate*4 | — | — | — | 10 | — | — | — | — | — | — | — |
| Tetraethylene glycol diacrylate | — | — | — | — | 5 | — | — | — | — | — | — |
| N-Vinylpyrrolidone*5 | 4 | 4 | 4 | 4 | 4 | 4 | 4 | 4 | 4 | 4 | 4 |
| 2-Ethylhexyl acrylate*6 | — | — | — | — | — | — | — | — | — | — | — |
| Acryloylmorpholine*6 | 38 | 38 | 38 | 38 | 38 | 27 | 27 | 28 | 27 | 20 | 48 |
| Thioxanthone type initiator*7 | 7 | 7 | 7 | 7 | 7 | 3.5 | 3.5 | 3.5 | 3.5 | 3.5 | 3.5 |
| Tertiary amine type sensitizer*8 | — | — | — | — | — | 3.5 | 3.5 | 3.5 | 3.5 | 3.5 | 3.5 |
| Pigment (carbon, iron black, extender pigment or the like) | 54 | 54 | 54 | 54 | 54 | 54 | 54 | 54 | 54 | 54 | 54 |
| Additive | 2 | 2 | 2 | 2 | 2 | 2 | 2 | 2 | 2 | 2 | 2 |
| Viscosity ps (25° C.) | 85 | 83 | 114 | 104 | 94 | 44 | 52 | 48 | 55 | 46 | 47 |

Note
*1Biscoat #190 supplied by Osaka Yuki Kagaku Kogyo K.K.
*2L-A supplied by Kyoeisha Yushi Kagaku Kogyo K.K.
*3Aronix M-101 supplied by Toa Gosei Kagaku Kogyo K.K.
*4Aronix M-120 supplied by Toa Gosei Kagaku Kogyo K.K.
*5V-Pyrol (registered trademark) supplied by GAF Corp.
*6ACMO supplied by Kohjin K.K.
*7, *8Initiator and sensitizer need not be incorporated in case of electron beam-curable screen ink.

TABLE 3-2

| Components | Composition Example No. | | | | | | | |
|---|---|---|---|---|---|---|---|---|
| | 26 | 27 | 28 | 29 | 30 | 31 | 32 | 33 |
| Oligomer | | | | | | | | |
| B | 43 | — | — | — | — | — | 43 | 43 |
| Polybd R-45ACR-LC*9 | — | 43 | — | — | — | — | — | — |
| G | — | — | 43 | — | — | — | — | — |
| H | — | — | — | 43 | — | — | — | — |
| I | — | — | — | — | 43 | — | — | — |
| J | — | — | — | — | — | 32 | — | — |
| Monomer | | | | | | | | |
| N-Vinylpyrrolidone*5 | 18 | 18 | 18 | 18 | 18 | 18 | 11 | 18 |
| Acryloylmorpholine*6 | 25 | 25 | 25 | 25 | 25 | 36 | 25 | 25 |
| Ethylcarbitol acrylate*1 | 14 | 14 | 14 | 14 | 14 | 14 | 7 | — |
| N-n-butyl-O-acryloyloxyethylcarbonate*2 | — | — | — | — | — | — | 14 | 14 |
| Thioxanthone type initiator*3 | 3.5 | 3.5 | 3.5 | 3.5 | 3.5 | 3.5 | 3.5 | 3.5 |
| Tertiary amine type sensitizer*4 | 3.5 | 3.5 | 3.5 | 3.5 | 3.5 | 3.5 | 3.5 | 3.5 |
| Pigment (carbon, iron black, extender | 100 | 100 | 100 | 100 | 100 | 100 | 100 | 100 |

TABLE 3-2-continued

| Components | Composition Example No. | | | | | | | |
|---|---|---|---|---|---|---|---|---|
| | 26 | 27 | 28 | 29 | 30 | 31 | 32 | 33 |
| pigment or the like) | | | | | | | | |
| Additive | 2 | 2 | 2 | 2 | 2 | 2 | 2 | 2 |
| Viscosity ps (25° C.) | 60 | 81 | 56 | 44 | 63 | 94 | 111 | 116 |

Note
*[1]Biscoat #190 supplied by Oraka Yuki Kagaku Kogyo K.K.
*[2]NISSOCURE UM-1 supplied by Nippon Soda K.K.
*[3], *[4]Initiator and sensitizer need not be incorporated in case of electron beam curing.
*[5]V-Pyrol (registered trademark) supplied by GAF Corp.
*[6]ACMO supplied by Kohjin K.K.
*[9]Product supplied by Idemitsu Sekiyu Kagaku K.K. (having butadiene skeleton in main chain)

TABLE 4

| Component | Comparative Composition Example No. | | | | |
|---|---|---|---|---|---|
| | 6 | 7 | 8 | 9 | 10 |
| Synthetic oligomer | | | | | |
| A | — | — | 43 | 43 | — |
| B | 43 | 43 | — | — | — |
| D | — | — | — | — | 55 |
| Tertiary amine-modified diacrylate oligomer | — | — | — | — | 9 |
| Monomer | | | | | |
| N-Vinylpyrrolidone*[5] | 57 | — | 57 | — | 27 |
| Acryloylmorpholine*[6] | — | 57 | — | 57 | — |
| 2-Ethylhexyl acrylate | — | — | — | — | 9 |
| Tetraethylene glycol diacrylate | — | — | — | — | — |
| Thioxanthone type initiator*[1] | 3.5 | 3.5 | 3.5 | 3.5 | 3.5 |
| Tertiary amine type sensitizer*[2] | 3.5 | 3.5 | 3.5 | 3.5 | 3.5 |
| Pigment (carbon, iron black, extender pigment or the like) | 100 | 100 | 100 | 100 | 54 |
| Additive | 2 | 2 | 2 | 2 | 2 |
| Viscosity ps (25° C.) | 35 | 120 | 95 | 383*[3] | 100 |

Note
*[1], *[2]Initiator and sensitizer need not be incorporated in case of electron beam curing.
*[3]Rotor rotation number = 50 rpm
*[5]V-Pyrol (registered trademark) supplied by GAF Corp.
*[6]ACMO supplied by Kohjin K.K.

CURING EXAMPLES

The physical properties of obtained coating films were evaluated according to the following methods.

i) Transmission density

The transmission density was measured by a transmission densitometer supplied by Danippon Screen K.K. (Model DM-500).

ii) S-S

The S-S value was measured by an autograph supplied by Shimazu Seisakusho K.K. (Model AG5000).

iii) Bending processability

The sample was bent at an outer diameter of 0.83R (mm), and breaking or cracking of the coating film was checked.

iv) Adhesion

The adhesion was evaluated by the square-cut peeling method using an adhesive cellophane tape. "100/100" means that all of square cuts adhered, while "0/100" means that all of square cuts were peeled. Furthermore, "tape NG" means that the coating film was peeled only by applying the tape.

Examples 1 through 14

Each of the white ink samples obtained in Composition Examples 1 through 14 was printed on a transparent polycarbonate sheet having a thickness of 0.5 mm or an acrylic resin molded plate having a thickness of 3 mm. Then, the coating film was cured at a light quantity of 900 mJ/cm$^2$ by a metal halide lamp. The portion, to be bent, of the coated and cured polycarbonate sheet was heated at about 100° C. and was then mechanically bent at an acute angle, and the bending processability was evaluated. The ink was printed and cured on a silicone resin plate in the above-mentioned manner, and the formed coating film was peeled from the plate and the S-S value was measured. The physical properties of the cured films are shown in Tables 5-1 through 5-3.

TABLE 5-1

| Example No. | Composition Example No. | Transmission density | Adhesion vs. substrate | Adhesion Evaluation result | Bending processability *[1] | Young's modulus (kg/mm$^2$) | Elongation (%) |
|---|---|---|---|---|---|---|---|
| 1 | 1 | 0.58 | vs. polycarbonate sheet | 100/100 | ○ | 4.8 | 207 |
| | | | vs. acrylic resin plate | 100/100 | | | |

TABLE 5-1-continued

| Example No. | Composition Example No. | Transmission density | Adhesion vs. substrate | Evaluation result | Bending processability *1 | Young's modulus (kg/mm$^2$) | Elongation (%) |
|---|---|---|---|---|---|---|---|
| 2 | 2 | 0.57 | vs. polycarbonate sheet | 100/100 | ○ | 6.2 | 210 |
|   |   |   | vs. acrylic resin plate | 100/100 |   |   |   |
| 3 | 3 | 0.58 | vs. polycarbonate sheet | 100/100 | ○ | 23 | 178 |
|   |   |   | vs. acrylic resin plate | 100/100 |   |   |   |
| 4 | 4 | 0.59 | vs. polycarbonate sheet | 100/100 | ○ | 6.5 | 220 |
|   |   |   | vs. acrylic resin plate | 100/100 |   |   |   |
| 5 | 5 | 0.58 | vs. polycarbonate sheet | 100/100 | ○ | 39 | 128 |
|   |   |   | vs. acrylic resin plate | 100/100 |   |   |   |
| 6 | 6 | 0.57 | vs. polycarbonate sheet | 100/100 | ○ | 11 | 85 |
|   |   |   | vs. acrylic resin plate | 100/100 |   |   |   |

Note
*1 "○" indicates good processability and "x" indicates bad processability.

TABLE 5-2

| Example No. | Composition Example No. | Transmission density | Adhesion vs. substrate | Evaluation result | Bending processability *1 | Young's modulus (kg/mm$^2$) | Elongation (%) |
|---|---|---|---|---|---|---|---|
| 7 | 7 | 0.57 | vs. polycarbonate sheet | 100/100 | ○ | 11 | 87 |
|   |   |   | vs. acrylic resin plate | 100/100 |   |   |   |
| 8 | 8 | 0.59 | vs. polycarbonate sheet | 100/100 | ○ | 21 | 27 |
|   |   |   | vs. acrylic resin plate | 100/100 |   |   |   |
| 9 | 9 | 0.58 | vs. polycarbonate sheet | 100/100 *2 | ○ | 3.4 | 210 |
|   |   |   | vs. acrylic resin plate | 100/100 *2 |   |   |   |
| 10 | 10 | 0.59 | vs. polycarbonate sheet | 100/100 | ○ | 8.3 | 87 |
|   |   |   | vs. acrylic resin plate | 100/100 |   |   |   |
| 11 | 11 | 0.58 | vs. polycarbonate sheet | 100/100 | ○ | 1.1 | 126 |
|   |   |   | vs. acrylic resin plate | 100/100 |   |   |   |
| 12 | 12 | 0.58 | vs. polycarbonate sheet | 100/100 | ○ | 1.2 | 122 |
|   |   |   | vs. acrylic resin | 100/100 |   |   |   |

TABLE 5-2-continued

| Example No. | Composition Example No. | Transmission density | Adhesion vs. substrate | Evaluation result | Bending processability *1 | Young's modulus (kg/mm$^2$) | Elongation (%) |
|---|---|---|---|---|---|---|---|
| | | | plate | | | | |

Note
*2: nail peeling was caused because of large tack.

TABLE 5-3

| Example No. | Composition Example No. | Transmission density | Adhesion vs. substrate | Evaluation result | Bending processability | Young's modulus (kg/mm$^2$) | Elongation (%) |
|---|---|---|---|---|---|---|---|
| 13 | 13 | 0.58 | vs. polycarbonate sheet | 100/100 | ○ | 3.1 | 142 |
| | | | vs. acrylic resin plate | 100/100 | | | |
| 14 | 14 | 0.59 | vs. polycarbonate sheet | 100/100 | ○ | 6.9 | 255 |
| | | | vs. acrylic resin plate | 100/100 | | | |

As is apparent from Tables 5-1 through 5-3, in case of the white ink compositions used in the foregoing examples, the formed films had a very excellent adhesion, irrespective of the kind of the substrate (polycarbonate sheet and acrylic resin plate). Furthermore, good results were obtained with respect to the bending processability. Cracking or breaking of the film in the bent portion was not caused in any of the samples.

Moreover, in the samples of the foregoing examples, even if the printing stop time was 30 minutes, so-called waste printing was not necessary and printing could be efficiently performed even from the start. Thus, it was confirmed that a very excellent printability was attained. This fact indicates that at the actual printing operation, the productivity can be highly improved.

Comparative Examples 1 through 5

White ink samples obtained in Comparative Composition Examples 1 through 5 were printed and cured in the same manner as described in Examples 1 through 14.

The physical properties of the obtained cured films are shown in Table 6.

TABLE 6

| Comparative Example No. | Composition Example No. | Transmission density | Adhesion vs. substrate | Evaluation result | Bending processability *1 | Young's modulus (kg/mm$^2$) | Elongation (%) |
|---|---|---|---|---|---|---|---|
| 1 | 1 | 0.70 | vs. polycarbonate sheet | 100/100 | ○ | 9.6 | 82 |
| | | | vs. acrylic resin plate | 100/100 | | | |
| 2 | 2 | 0.68 | vs. polycarbonate sheet | 85/100 | ○ | 60 | 5.4 |
| | | | vs. acrylic resin plate | 0/100 tape NG | | | |
| 3 | 3 | 0.69 | vs. polycarbonate sheet | 100/100 | ○ | 1.5 | 142 |
| | | | vs. acrylic resin plate | 100/100 | | | |
| 4 | 4 | 0.65 | vs. polycarbonate sheet | 100/100 | ○ | 38 | 108 |
| | | | vs. acrylic resin plate | 50/100 | | | |
| 5 | 5 | 0.60 | vs. polycarbonate sheet | 100/100 | ○ | 37 | 62 |
| | | | vs. | 100/100 | | | |

TABLE 6-continued

| Comparative Example No. | Composition Example No. | Transmission density | Adhesion | | Bending processability *1 | Physical properties of film | |
|---|---|---|---|---|---|---|---|
| | | | vs. substrate | Evaluation result | | Young's modulus (kg/mm$^2$) | Elongation (%) |
| | | | acrylic resin plate | | | | |

Note:
*1: "○" indicates good processability and "x" indicates bad processability.

As is apparent from Table 6, the ink compositions of Composition Examples 2 and 4, where only acryloylmoepholine was used as the polymerizable monomer to be incorporated in the polyurethane (meth)acrylate resin, were very poor in the adhesion to the substrate (acrylic resin plate). The ink compositions of Comparative Examples 1, 3, and 5, where only N-vinylpyrrolidone was used as the polymerizable monomer, were excellent in the adhesion to the substrate, but in case of these ink compositions, if the printing stop time was 15 minutes, waste printing had to be conducted about 5 times, and if the printing stop time was 30 minutes, waste printing had to be conducted about 10 times (in three of waste-printed substrates, plate separation was insufficient). Accordingly, it was confirmed that the printing stability was poor in these ink compositions.

Examples 15 through 33

Black ink samples obtained in Composition Examples 15 through 33 were printed and cured in the same manner as described in Examples 1 through 14.

The physical properties of the cured films are shown in Tables 7-1 through 7-4.

TABLE 7-1

| Example No. | Composition Example No. | Transmission density | Adhesion | | Bending processability *1 | Physical properties of film | |
|---|---|---|---|---|---|---|---|
| | | | vs. substrate | Evaluation result | | Young's modulus (kg/mm$^2$) | Elongation (%) |
| 15 | 15 | 2.3 | vs. polycarbonate sheet | 100/100 | ○ | 21 | 102 |
| | | | vs. acrylic resin plate | 100/100 | | | |
| 16 | 16 | 2.3 | vs. polycarbonate sheet | 100/100 | ○ | 38 | 92 |
| | | | vs. acrylic resin plate | 100/100 | | | |
| 17 | 17 | 2.2 | vs. polycarbonate sheet | 100/100 | ○ | 49 | 79 |
| | | | vs. acrylic resin plate | 100/100 | | | |
| 18 | 18 | 2.3 | vs. polycarbonate sheet | 100/100 | ○ | 24 | 102 |
| | | | vs. acrylic resin plate | 100/100 | | | |
| 19 | 19 | 2.3 | vs. polycarbonate sheet | 100/100 | ○ | 58 | 63 |
| | | | vs. acrylic resin plate | 100/100 | | | |
| 20 | 20 | 2.3 | vs. polycarbonate sheet | 100/100 | ○ | 13 | 101 |
| | | | vs. acrylic resin plate | 100/100 | | | |

*1: "○" indicates good processability and "x" indicates bad processability.

TABLE 7-2

| Example No. | Composition Example No. | Transmission density | Adhesion | | Bending processability *1 | Physical properties of film | |
|---|---|---|---|---|---|---|---|
| | | | vs. substrate | Evaluation result | | Young's modulus (kg/mm$^2$) | Elongation (%) |
| 21 | 21 | 2.2 | vs. | 100/100 | ○ | 13 | 70 |

TABLE 7-2-continued

| Example No. | Composition Example No. | Trans- mission density | Adhesion vs. substrate | Evaluation result | Bending process- ability *1 | Young's modulus (kg/mm$^2$) | Elon- gation (%) |
|---|---|---|---|---|---|---|---|
| | | | polycarbonate sheet | 100/100 | | | |
| | | | vs. acrylic resin plate | | | | |
| 22 | 22 | 2.2 | vs. polycarbonate sheet | 100/100 | ○ | 12 | 106 |
| | | | vs. acrylic resin plate | 100/100 | | | |
| 23 | 23 | 2.3 | vs. polycarbonate sheet | 100/100 | ○ | 11 | 76 |
| | | | vs. acrylic resin plate | 100/100 | | | |
| 24 | 24 | 2.2 | vs. polycarbonate sheet | 100/100 | ○ | 23 | 40 |
| | | | vs. acrylic resin plate | 100/100 | | | |
| 25 | 25 | 2.3 | vs. polycarbonate sheet | 100/100 *2 | ○ | 4.5 | 198 |
| | | | vs. acrylic resin plate | 100/100 *2 | | | |
| 26 | 26 | 2.3 | vs. polycarbonate sheet | 100/100 | ○ | 24 | 103 |
| | | | vs. acrylic resin plate | 100/100 | | | |

*: nail peeling was caused because of large tack.

TABLE 7-3

| Example No. | Composition Example No. | Trans- mission density | Adhesion vs. substrate | Evaluation result | Bending process- ability *1 | Young's modulus (kg/mm$^2$) | Elon- gation (%) |
|---|---|---|---|---|---|---|---|
| 27 | 27 | 2.3 | vs. polycarbonate sheet | 100/100 | ○ | 3.0 | 91 |
| | | | vs. acrylic resin plate | 100/100 | | | |
| 28 | 28 | 2.3 | vs. polycarbonate sheet | 100/100 | ○ | 1.5 | 80 |
| | | | vs. acrylic resin plate | 100/100 | | | |
| 29 | 29 | 2.3 | v.s polycarbonate sheet | 100/100 | ○ | 1.5 | 94 |
| | | | vs. acrylic resin plate | 100/100 | | | |
| 30 | 30 | 2.3 | vs. polycarbonate sheet | 100/100 | ○ | 2.1 | 125 |
| | | | vs. acrylic resin plate | 100/100 | | | |
| 31 | 31 | 2.3 | vs. polycarbonate sheet | 100/100 | ○ | 8.9 | 183 |
| | | | vs. acrylic resin plate | 100/100 | | | |

TABLE 7-3-continued

| Example No. | Composition Example No. | Transmission density | Adhesion vs. substrate | Evaluation result | Bending processability *1 | Young's modulus (kg/mm²) | Elongation (%) |
|---|---|---|---|---|---|---|---|
| 32 | 32 | 2.3 | vs. polycarbonate sheet | 100/100 | ○ | 27 | 67 |
|  |  |  | vs. acrylic resin plate | 100/100 |  |  |  |

TABLE 7-4

| Example No. | Composition Example No. | Transmission density | Adhesion vs. substrate | Evaluation result | Bending processability *1 | Young's modulus (kg/mm²) | Elongation (%) |
|---|---|---|---|---|---|---|---|
| 33 | 33 | 2.3 | vs. polycarbonate sheet | 100/100 | ○ | 64 | 44 |
|  |  |  | vs. acrylic resin plate | 100/100 |  |  |  |

As is apparent from Tables 7-1 through 7-4, each of the ink compositions of Examples 15 through 33 was excellent in the adhesion to the substrate and the processability. When the printing stop time was 15 minutes, waste printing was not necessary in any of these examples, and when the printing stop time was 30 minutes, waste printing had to be conducted only once and the second and subsequent substrates could be effectively printed. Thus, it was confirmed that a good printability was attained in one of the foregoing examples.

Comparative Examples 6 through 10

Black ink samples obtained in Comparative Composition Examples 6 through 10 were printed and cured in the same manner as described in Examples 1 through 14.

The physical properties of the cured films are shown in Table 8.

TABLE 8

| Comparative Example No. | Comparative Composition Example No. | Transmission density | Adhesion vs. substrate | Evaluation result | Bending processability *1 | Young's modulus (kg/mm²) | Elongation (%) |
|---|---|---|---|---|---|---|---|
| 6 | 6 | 2.4 | vs. polycarbonate sheet | 100/100 | x | 22 | 57 |
|  |  |  | vs. acrylic resin plate | 100/100 |  |  |  |
| 7 | 7 | 2.4 | vs. polycarbonate sheet | 80/100 | ○ | 58 | 11 |
|  |  |  | vs. acrylic resin plate | 0/100 tape NG |  |  |  |
| 8 | 8 | 2.5 | vs. polycarbonate sheet | 100/100 | x | 4.1 | 152 |
|  |  |  | vs. acrylic resin plate | 100/100 |  |  |  |
| 9 | 9 | 2.5 | vs. polycarbonate sheet | 95/100 | ○ | 26 | 31 |
|  |  |  | vs. acrylic resin plate | 15/100 |  |  |  |
| 10 | 10 | 2.3 | vs. polycarbonate sheet | 100/100 | x | 6.4 | 74 |
|  |  |  | vs. acrylic resin plate | 100/100 |  |  |  |

Note: *1: "○" indicates good processability and "x" indicates bad processability.

As is apparent from Table 8, the ink compositions of Comparative Examples 7 and 9, where acryloylmorpholine alone was used as the polymerizable monomer to be incorporated in the polyurethane (meth)acrylate resin, were very poor in the adhesion to the substrate (acrylic resin plate), and the ink compositions of Comparative Examples 6 and 8, where N-vinylpyrrolidone alone was used as the polymerizable monomer, and the ink composition of Comparative Example 10, where N-vinylpyrrolidone and 2-ethylhexyl acrylate were used as the polymerizable monomer, were excellent in the adhesion to the substrate but the bending processability was bad and cracking or breaking was caused in the cured films. In the case of the ink compositions of Comparative Examples 6, 8, and 10, when the printing stop time was 15 minutes, waste printing had to be conducted about 5 times, and when the printing stop time was 30 minutes, waste printing had to be conducted about 10 times (in three of waste-printed substrates, plate separation was insufficient). Thus, it was confirmed that the printing stability was poor in these ink compositions.

Examples 34 through 52

White inks shown in Composition Examples 1 through 14 and black inks shown in Composition Examples 15 through 33 were lap-coated on polycarbonate sheets having a thickness of 0.5 mm, and the adhesion and processability were evaluated. The obtained results are shown in Tables 9-1 through 9-3. The printing method was the same as adopted in Examples 1 through 14.

Incidentally, the press processability was determined in the following manner. The sample ink was lap-coated on the polycarbonate sheet having a thickness of 0.5 mm as mentioned above, and a rectangular hole of 30 mm×5 mm was formed by punching and the peeling test using an adhesive cellophane tape was conducted on the film on the periphery of the punched portion. The symbol "o" indicates that the film was not peeled by peeling of the tape, and the symbol "x" indicates that the film was peeled by peeling of the tape.

TABLE 9-1

| Example No. | Printing order | Lap-coating conditions — Kind of ink (composition Example No.) | Curing light quantity (mJ/cm$^2$) | Adhesion | Press processability | Bending processability |
|---|---|---|---|---|---|---|
| 34 | 1 | white (1) | 900 × 3 times | 100/100 | o | o |
|  | 2 | black (15) | 900 |  |  |  |
|  | 3 | black (15) | 900 |  |  |  |
| 35 | 1 | white (2) | 900 × 3 times | 100/100 | o | o |
|  | 2 | black (16) | 900 |  |  |  |
|  | 3 | black (16) | 900 |  |  |  |
| 36 | 1 | white (3) | 900 × 3 times | 100/100 | o | o |
|  | 2 | black (17) | 900 |  |  |  |
|  | 3 | black (17) | 900 |  |  |  |
| 37 | 1 | white (4) | 900 × 3 times | 100/100 | o | o |
|  | 2 | black (18) | 900 |  |  |  |
|  | 3 | black (18) | 900 |  |  |  |
| 38 | 1 | white (5) | 900 × 3 times | 100/100 | o | o |
|  | 2 | black (19) | 900 |  |  |  |
|  | 3 | black (19) | 900 |  |  |  |
| 39 | 1 | white (6) | 900 × 3 times | 100/100 | o | o |
|  | 2 | black (20) | 900 |  |  |  |
|  | 3 | black (20) | 900 |  |  |  |

Note
o: good
x: bad

TABLE 9-2

| Example No. | Printing order | Lap-coating conditions — Kind of ink (composition Example No.) | Curing light quantity (mJ/cm$^2$) | Adhesion | Press processability | Bending processability |
|---|---|---|---|---|---|---|
| 40 | 1 | white (6) | 900 × 3 times | 100/100 | o | o |
|  | 2 | black (21) | 900 |  |  |  |
|  | 3 | black (21) | 900 |  |  |  |
| 41 | 1 | white (7) | 900 × 3 times | 100/100 | o | o |
|  | 2 | black (22) | 900 |  |  |  |
|  | 3 | black (22) | 900 |  |  |  |
| 42 | 1 | white (7) | 900 × 3 times | 100/100 | o | o |
|  | 2 | black (23) | 900 |  |  |  |
|  | 3 | black (23) | 900 |  |  |  |
| 43 | 1 | white (8) | 900 × 3 times | 100/100 | o | o |
|  | 2 | black (24) | 900 |  |  |  |
|  | 3 | black (24) | 900 |  |  |  |
| 44 | 1 | white (9) | 900 × 3 times | 100/100 (nail peeling) | o | o |
|  | 2 | black (25) | 900 |  |  |  |
|  | 3 | black (25) | 900 |  |  |  |
| 45 | 1 | white (6) | 900 × 3 times | 100/100 | o | o |
|  | 2 | black (26) | 900 |  |  |  |

TABLE 9-2-continued

| Example No. | Lap-coating conditions | | Adhesion | Press processability | Bending processability |
|---|---|---|---|---|---|
| | Printing order | Kind of ink (composition Example No.) / Curing light quantity (mJ/cm$^2$) | | | |
| | 3 | black (26) 900 | | | |

Note
o: good
x: bad

TABLE 9-3

| Example No. | Printing order | Kind of ink (composition Example No.) | Curing light quantity (mJ/cm$^2$) | Adhesion | Press processability | Bending processability |
|---|---|---|---|---|---|---|
| 46 | 1 | white (10) | 900 × 3 times | 100/100 | o | o |
| | 2 | black (27) | 900 | | | |
| | 3 | black (27) | 900 | | | |
| 47 | 1 | white (11) | 900 × 3 times | 100/100 | o | o |
| | 2 | black (28) | 900 | | | |
| | 3 | black (28) | 900 | | | |
| 48 | 1 | white (12) | 900 × 3 times | 100/100 | o | o |
| | 2 | black (29) | 900 | | | |
| | 3 | black (29) | 900 | | | |
| 49 | 1 | white (13) | 900 × 3 times | 100/100 | o | o |
| | 2 | black (30) | 900 | | | |
| | 3 | black (30) | 900 | | | |
| 50 | 1 | white (14) | 900 × 3 times | 100/100 | o | o |
| | 2 | black (31) | 900 | | | |
| | 3 | black (31) | 900 | | | |
| 51 | 1 | white (6) | 900 × 3 times | 100/100 | o | o |
| | 2 | black (32) | 900 | | | |
| | 3 | black (32) | 900 | | | |
| 52 | 1 | white (6) | 900 × 3 times | 100/100 | o | o |
| | 2 | black (33) | 900 | | | |
| | 3 | black (33) | 900 | | | |

Note
o: good
x: bad

As is apparent from Tables 9-1 through 9-3, in Examples 34 through 52, the adhesion of the coating film to the substrate was excellent in the lap-coating, and breaking or cracking was not caused even when the coated substrate was processed.

Comparative Examples 11 through 15

White inks of Comparative Composition Examples 1 through 5 and black inks of Comparative Composition Examples 6 through 10 were lap-coated on polycarbonate sheets having a thickness of 0.5 mm. The adhesion, press processability, and bending processability were evaluated. The obtained results are shown in Table 10. The printing method was the same as adopted in Examples 1 through 14.

TABLE 10

| Example No. | Printing order | Kind of ink (comparative composition Example No.) | Curing light quantity (mJ/cm$^2$) | Adhesion | Press processability | Bending processability |
|---|---|---|---|---|---|---|
| 11 | 1 | white (1) | 900 × 3 times | 100/100 | o | o |
| | 2 | black (6) | 900 | | | |
| | 3 | black (6) | 900 | | | |
| 12 | 1 | white (2) | 900 × 3 times | 50/100 | x | o |
| | 2 | black (7) | 900 | | | |
| | 3 | black (7) | 900 | | | |
| 13 | 1 | white (3) | 900 × 3 times | 100/100 | o | o |
| | 2 | black (8) | 900 | | | |
| | 3 | black (8) | 900 | | | |
| 14 | 1 | white (4) | 900 × 3 times | 85/100 | x | o |
| | 2 | black (9) | 900 | | | |
| | 3 | black (9) | 900 | | | |
| 15 | 1 | white (5) | 900 × 3 times | 100/100 | o | x |
| | 2 | black (10) | 900 | | | |
| | 3 | black (10) | 900 | | | |

Note
o: good
x: bad

As is apparent from Table 10, in Comparative Examples 12 and 14, peeling of the film was observed at the press-processing, and in Comparative Example 15, the film was cracked and broken at the bending-processing.

Example 53

White inks of Composition Examples 6 and 7 were printed and cured on polycarbonate sheets having a thickness of 0.5 mm according to the printing method described in Examples 1 through 14, and the coated sheets were draw-formed under the following conditions.

Figure 2:
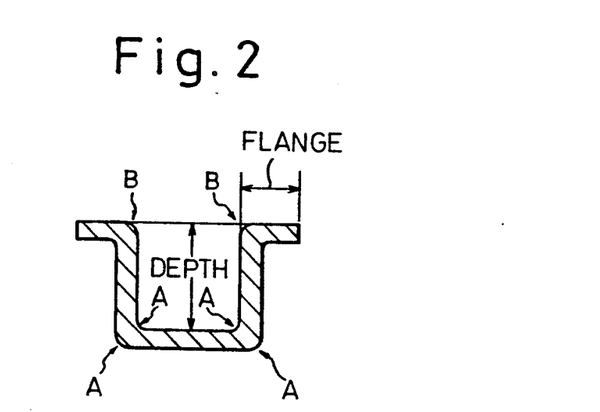

Namely, the coated polycarbonate sheet was stopped for 5 seconds between upper and lower molds maintained at 140° C. in the state which the sheet in contact with each mold. Then, the sheet was stopped for 15 seconds at the bottom dead point, whereby the coated sheet was draw-formed into a cup, as shown in FIG. 2. The drawing depth was about 3.22 mm, and the bending outer diameter at points A and B was about 1.0 mm, the outer diameter of the drawn portion was 58 mm, and the outer diameter of the flange portion was 10 mm.

In case of the white inks of Composition Examples 6 and 7, breaking or cracking was not caused at the above draw-forming operation.

Example 54

Printing and draw-forming were carried out in the same manner as described in Example 53 by using black inks of Composition Examples 20, 22, 26, 32, and 33.

Cracking or breaking of the coating film was not observed in any of these black inks.

Comparative Example 17

According to the methods of Example 53, printing was carried out using the black inks shown in Comparative Examples 6–10 and draw-forming was carried out.

Cracking and breaking of the film were observed in all of the black inks shown in Comparative Examples 6–10.

Example 55

According to the methods of Example 53, printing and draw-forming were carried out under the same lap-coating conditions as those of Example 39 in Table 9-1, Example 41 and 45 in Table 9-2 and Examples 51 and 52 in Table 9-3 (i.e., the printing order, the kind of ink, and curing light quantity are the same as those in Tables 9-1 to 9-3).

Cracking or breaking of the film was not observed in any of the lap-coating inks of this Example.

Comparative Example 18

According to the printing method of Example 53, lap-coating was carried out under the same lap coating conditions as in Comparative Examples 11 through 15 shown in Table 10 (the printing order, the kind of the ink, and the curing light quantity were the same as shown in Table 10), and the coated sheets were draw-formed in the same manner as described in Example 53.

Cracking and breaking of the film were observed in all of the inks used in this comparative example.

Example 56

A white ink formed by removing only the initiator from the ink shown in Composition Example 1 was coated on a transparent polycarbonate sheet having a thickness of 0.5 mm in the same manner as described in Examples 1 through 14, and the coating was cured by irradiation with 1.5 Mrad of electron beams in an $N_2$ atmosphere. The adhesion was 100/100. Incidentally, the transmission density of the white ink was 0.95.

Example 57

A black ink formed by removing the initiator and sensitizer from the ink shown in Composition Example 15 was coated on a transparent polycarbonate sheet having a thickness of 0.5 mm in the same manner as described in Examples 1 through 14, and the coating was cured by irradiation with 1.5 Mrad of electron beams in an $N_2$ atmosphere. The adhesion was 100/100. Incidentally, the transmission density of the black ink was 4.95.

Referential Example

Monomers other than acryloylmorpholine and N-vinylpyrrolidone used in the foregoing examples and comparative examples were used as the polymerizable monomer to be incorporated into the polyurethane (meth)acrylate resin. Namely, 2-ethylhexyl acrylate (2-EHA), ethylcarbitol acrylate (ECA), diethylene glycol (2-ethylhexyl) ether acrylate (DEGEHA), nonylphenoxyethyl acrylate (NPEA) and 2-hydroxy-3-phenoxypropyl acrylate (HPPH) were used as the polymerizable monomer. The structures and tradenames of these monomers are shown in Table 11.

TABLE 11

| Structural formula of monomer | Tradename (maker) |
| --- | --- |
| $CH_2=CHCCH_2CH(CH_2)_3CH_3$<br>$\quad\quad\ \ \|\|\quad\ \ \|$<br>$\quad\quad\ \ O\quad CH_2CH_3$<br><br>2-ethylhexyl acrylate (2-EHA) | |
| $CH_2=CHCO(CH_2CH_2O)_2C_2H_5$<br>$\quad\quad\ \ \|\|$<br>$\quad\quad\ \ O$<br><br>ethylcarbitol acrylate (ECA) | Biscoat #190<br>(Osaka Yuki) |
| $CH_2=CHCO(C_2H_4O)_2CH_2CH(CH_2)_3.CH_3$<br>$\quad\quad\ \ \|\|\quad\quad\quad\quad\quad\ \ \|$<br>$\quad\quad\ \ O\quad\quad\quad\quad\quad\ \ C_2H_5$<br><br>diethylene glycol (2-ethyhexyl)ether<br>acrylate (DEGEHA) | Aronix M-120<br>(Toa Gosei Kagaku) |
| $CH_2=CHCOC_2H_4OC_6H_5C_9H_{19}$<br>$\quad\quad\ \ \|\|$<br>$\quad\quad\ \ O$<br><br>nonylphenoxyethyl acrylate (NPEA) | Aronix M-111<br>(Toa Gosei Kagaku) |
| $CH_2=CHCOCH_2CHCH_2OC_6H_5C_3H_7$<br>$\quad\quad\ \ \|\|\quad\quad\ \ \|$<br>$\quad\quad\ \ O\quad\quad OH$<br><br>2-hydroxy-3-phenoxypropyl acrylate<br>(HPPA) | Aronix M-5700<br>(Toa Gosei Kagaku) |

Oligomer A obtained in Synthesis Example 1 was mixed with the monomer shown in Table 11 at a weight ratio of 6/4, and a photoinitiator (Irgacure 184 supplied by Nippon Ciba-Geigy K.K.) was incorporated into the mixture in an amount of 3% by weight based on the mixture. The properties of the obtained resin compositions are shown in Table 12.

TABLE 12

| Urethane oligomer | Polymerizable monomer | Viscosity (ps/25° C.) | Tack (g) | Square-cut adhesion vs. polycarbonate sheet | | vs. acrylic resin plate | | Elongation (%) | Tensile strength (kg/mm$^2$) | Young's modulus (kg/mm$^2$) | Film thickness (μm) | Remarks |
|---|---|---|---|---|---|---|---|---|---|---|---|---|
| Oligomer A (60 parts) | 2-EHA (40 parts) | 46 | 160.8 ±26.1 | 94/100 | Cohesive failure Easy nail peeling | 100/100 | Easy nail peeling | — | — | — | — | peeling of film impossible |
| | ECA (40 parts) | 105 | 107.9 ±15.6 | 100/100 | Easy nail peeling | 95/100 | Easy nail peeling | 107 ±27.1 | 0.077 ±0.017 | 0.108 ±0.0003 | 86 | — |
| | DEGEHA (40 parts) | 240 | 136.7 ±6.2 | 100/100 | Easy nail peeling | 11/100 | Easy nail peeling | 86.9 ±9.95 | 0.051 ±0.005 | 0.074 ±0.012 | 78 | — |
| | NPEA (40 parts) | 2300 | 225.3 ±12.1 | 75/100 | Easy nail peeling | Tape NG, Medium nail peeling | | 172 ±11.9 | 0.242 ±0.02 | 0.154 ±0.008 | 88 | — |
| | HPPH (40 parts) | 1500 | 206.2 ±25.7 | 93/100 | Easy nail peeling | Tape NG, Medium nail peeling | | 149 ±5.5 | 0.198 ±0.02 | 0.166 ±0.02 | 97 | — |

The tack in Table 12 was evaluated in the following manner. Namely, the sample composition shown in Table 12 was coated on a transparent polycarbonate sheet and cured at a light quantity of 150 mJ/cm$^2$ by a metal halide lamp. The tackiness of the cured film surface was evaluated and expressed as the tack. Accordingly, the tack indicates the curing characteristics of the composition. Namely, a smaller value of the tack indicates a higher curing speed. Incidentally, the tack was measured by using a tack roll unit of a surface property-measuring device supplied by Shinto Kagaku K.K.

The square-cut adhesion and viscosity were evaluated in the same manner as described in Examples 1 through 14. The film characteristics were determined on the cured film peeled from the above-mentioned coated silicone plate by using an autograph supplied by Shimazu Seisakusho (Model AG5000).

From the results shown in Table 12, it is seen that in each of the foregoing compositions, the tack value was large and the curing speed was low, and the adhesion to the substrate was very bad. Accordingly, from the results shown in Table 12, it is understood that when the polymerizable monomers shown in Table 12 were used, the obtained performances were much lower than those obtained when acryloylmorpholine and N-vinylpyrrolidone were used in combination according to the present invention, and the resulting compositions could not be put into practical use.

We claim:

1. A resin composition comprising a polyurethane (meth-) acrylate resin, N-vinylpyrrolidone, and acryloylmorpholine, wherein the mixing ratio of the polyurethane (meth-) acrylate resin, N-vinylpyrrolidone and acryloylmorpholine is, referring to FIG. 1, within the range surrounded by the lines connecting point A (100% of polyurethane (meth-) acrylate), point B (100% of acryloylmorpholine) and point C (60% of polyurethane (meth-) acrylate and 40% of N-vinylpyrrolidone), excluding the points A, B and C, a line connecting the points A and B, a line connecting the points B and C, and a line connecting the points A and C, wherein all of said three components are present.

2. A resin composition according to claim 1, wherein the polyurethane (meth-)acrylate resin has a number average molecular weight of about 1500 to 10,000.

3. A resin composition according to claim 1, further comprising a photoinitiator.

4. A resin composition according to claim 3, wherein the photoinitiator is selected from the group consisting of acetophenones, benzophenones, Michler's ketone, benzil, benzain alkyl ethers, benzyl dimethyl ketal, and benzoyl benzoate, thioxanthones and tetramethyl thiuram monosulfide.

5. A resin composition according to claim 3, further comprising a sensitizer.

6. A resin composition according to claim 1, where the polyurethane (meth-)acrylate resin is a resin obtained by reacting a poly-ε-caprolactone polyol with an organic polyisocyanate at an NCO group/OH group ratio of from 1 to 2, with a hydroxy(meth)acrylate compound in an amount of 1 to 1.1 moles per mole of the residual NCO group in the prepolymer.

7. A resin composition according to claim 6, where the poly-ε-caprolactone polyol is a reaction product of an ε-caprolactone with a compound having two or more hydroxide groups.

8. A resin composition according to claim 6, where the poly-ε-caprolactone polyol has a number average molecular weight of about 510 to 2100.

9. A resin composition according to claim 7, wherein the compound having two or more hydroxide groups is selected from the group consisting of ethylene glycol, propylene glycol, diethylene glycol, pentaerythritol, trimethylolpropane, and neopentyl glycol.

10. A resin composition according to claim 6, wherein the organic polyisocyanate is selected from the group consisting of tolylene diisocyanate, 4,4'-diphenylmethane diisocyanate, isophorone diisocyanate, 4,4'-dicyclohexylmethane diisocyanate, hexamethylene diisocyanate, and 2,2'-trimethylhexamethylene diisocyanate.

11. A resin composition according to claim 6, wherein the hydroxide (meth)acrylate compound is selected from the group consisting of β-hydroxyethyl (meth)acrylate, β-hydroxypropyl (meth)acrylate, β-hydroxylauryl (meth)acrylate, and an ε-caprolactone/β-hydroxyethyl (meth)acrylate adduct.

12. A resin composition according to claim 1, further comprising a monofunctional ethylenic unsaturated monomer or a bifunctional ethylenic unsaturated monomer.

13. A resin composition according to claim 1, further comprising a pigment.

14. A resin composition according to claim 1, further comprising at least one of the group consisting of a defoaming agent, a levelling agent, a pigment-wetting agent, a dispersing agent, a slipping agent, a flow modifiers, and a thermal polymerization inhibitor.

* * * * *